United States Patent [19]
Collette et al.

[11] 4,335,821
[45] Jun. 22, 1982

[54] BLOW MOLDED PLASTIC MATERIAL BOTTLE BOTTOM

[75] Inventors: Wayne N. Collette, Westmoreland; Suppayan M. Krishnakumar; Gautam K. Mahajan, both of Nashua, all of N.H.

[73] Assignee: The Continental Group, Inc., New York, N.Y.

[21] Appl. No.: 203,924

[22] Filed: Nov. 4, 1980

Related U.S. Application Data

[62] Division of Ser. No. 54,500, Jul. 3, 1979, Pat. No. 4,267,144.

[51] Int. Cl.³ .............................................. B65D 1/02
[52] U.S. Cl. ...................................... 215/1 C; 220/70
[58] Field of Search ........................... 215/1 C; 220/70

[56] References Cited

U.S. PATENT DOCUMENTS

| | | | |
|---|---|---|---|
| 3,570,057 | 3/1971 | Doyle | 425/522 |
| 3,598,270 | 8/1971 | Adomaitis | 215/1 C |
| 3,665,063 | 5/1972 | Rupert et al. | 264/540 X |
| 3,727,783 | 4/1973 | Carmichael | 215/1 C |
| 3,789,093 | 1/1974 | Bose | 264/540 X |
| 3,935,955 | 2/1976 | Das | 215/1 C |
| 3,948,404 | 4/1976 | Collins et al. | 215/1 C |
| 4,054,017 | 10/1977 | Naumann | 425/522 X |
| 4,192,843 | 3/1980 | Trieschock et al. | 264/523 X |

*Primary Examiner*—Donald F. Norton
*Attorney, Agent, or Firm*—Charles E. Brown

[57] ABSTRACT

This disclosure relates to a minor change in the bottom configuration of a blow molded container and bottle formed of a plastic material which compensates for shrinkage in the bottom structure due to improper cooling whereby the improper cooling may be advantageously utilized to provide for a marked decrease in the blow molding cycle time.

3 Claims, 4 Drawing Figures

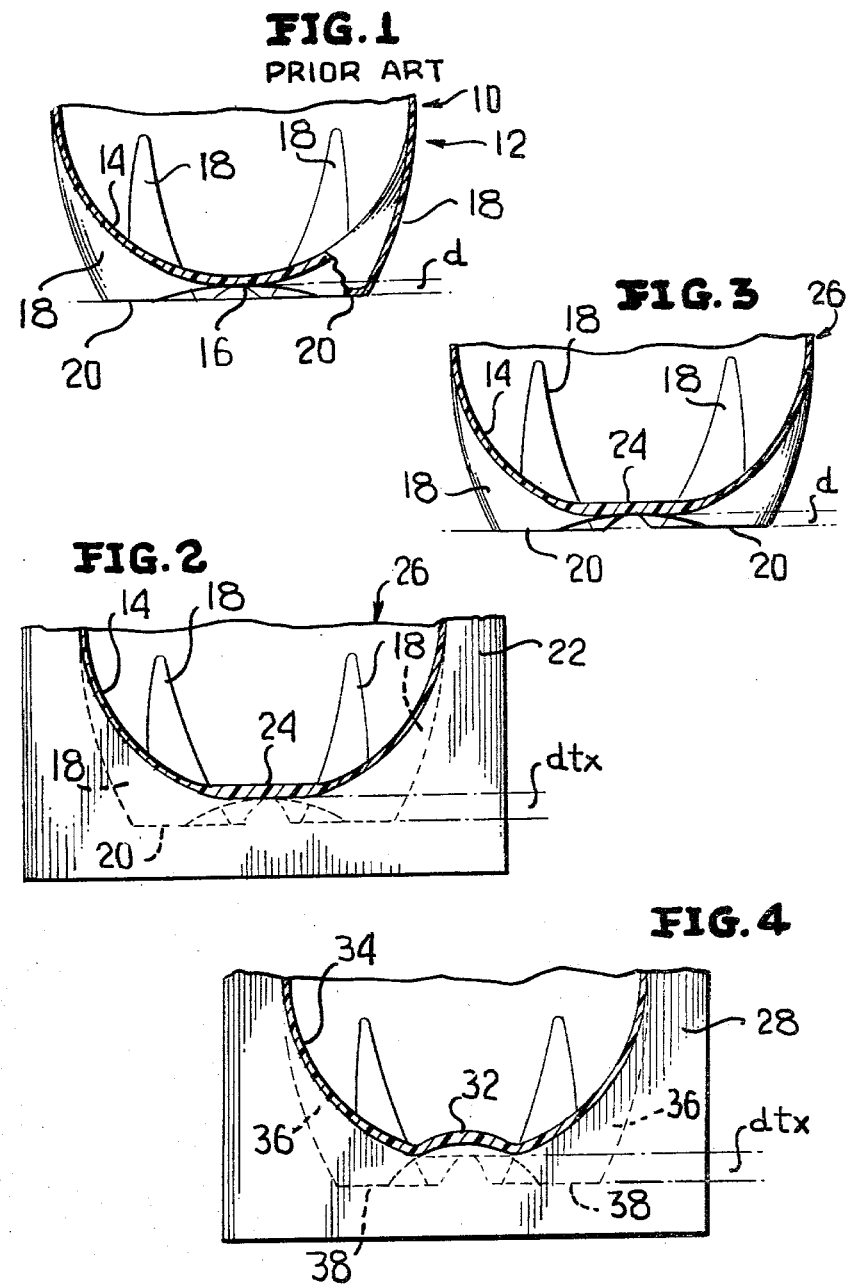

BLOW MOLDED PLASTIC MATERIAL BOTTLE BOTTOM

This is a division of Ser. No. 54,500, filed July 3, 1979, now U.S. Pat. No. 4,267,144.

This invention relates in general to the blow molding of containers having a generally hemispherical bottom portion with a plurality of hollow legs projecting therefrom and terminating in feet in a plane below the bottom section. Most particularly, this invention relates to a novel process of expediting the blow molding cycle of containers such as the bottle of the U.S. patent to Adomaitis et al U.S. Pat. No. 3,598,270, granted Aug. 10, 1971.

The bottle in question is formed by first injection molding a suitable preform and thereafter placing that preform when in a heated condition in a blow mold and blow molding the same under internal pressure.

Such bottle is generally used for pressurized application such as a beverage bottle. These bottles are subjected to pressure generally by carbonated liquids and specified shelf lives. During the shelf life, the bottles should remain stable. This implies that there should be always a gap between the dome of the bottom wall and the feet during the shelf life of the container.

In general, these bottles are removed from the blow mold before they are completely cured or cooled. Because of this, there is a shrinkage that occurs when the bottle comes out of the mold. This skrinkage reduces the gap between the bottom dome and the feet. When the bottle is pressurized with carbonated liquid, this gap decreases further. As time goes on, there is material creep and consequently the gap becomes even smaller. When the gap is eliminated or becomes negative due to the time-pressure exposure, an unstable condition then exists. Thus, the gap at the time of withdrawal from the mold is critical. In accordance with this invention it has been found that the cheapest solution to production costs is a minimum residence time in the blow mold. With this invention, the residence time in the mold can be reduced by as much as 40-50%.

Most specifically, the invention has to do with modifying the surface of the blow mold relating to the dome or polar part of the hemispherical bottom section so that in lieu of being hemispherical it is either flattened or modified to be convex in an upward direction, thereby increasing in the mold the distance or gap between the bottom of the feet and the bottom of the hemispherical bottom portion.

Such a modification in the blow mold would not normally lead to unexpected results. However, it has been found that if the blown bottle is prematurely removed from the blow mold before it has had sufficient time for the plastic material of the bottom to set, there is a shrinkage of the legs and feet portions relative to the hemispherical bottom portion with the result that the bottom is no longer a stable base. In accordance with this invention, by increasing the spacing between the feet and the polar part of the hemispherical bottom portion, this undesired shrinkage can be compensated for with the result that after the shrinkage has resulted, the original spacing between the bottom of the feet and the bottom of the hemispherical bottom portion, now only generally hemispherical, exists, thereby providing a stable base notwithstanding the shrinkage.

While it is possible to obtain this increase in spacing by extending the legs, it has been deemed more practical to either slightly flatten the polar part of the hemispherical bottom portion or make the same upwardly convex.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a vertical sectional view taken through the bottom part of a container formed in accordance with the disclosure of the U.S. patent to Adomaitis et al U.S. Pat. No. 3,598,270, granted Aug. 10, 1971.

FIG. 2 is a fragmentary vertical sectional view through the lower part of a blow mold having formed therein a container similar to that of FIG. 1, but with a modification in the bottom structure in accordance with this invention.

FIG. 3 is a fragmentary vertical sectional view taken through the bottom portion of the container of FIG. 2 subsequent to shrinkage.

FIG. 4 is a fragmentary vertical sectional view similar to FIG. 2, and shows a slightly modified mold surface configuration and resultant modified blown bottle bottom structure.

Referring now to the drawings in detail, reference is first made to the prior art shown in FIG. 1 wherein a container formed in accordance with the Adomaitis et al patent is illustrated, the container being generally identified by the numeral 10. Substantially only the bottom structure of the container 10 is illustrated, the bottom structure being identified by the numeral 12. The bottom structure 12 includes a hemispherical wall portion 14 which has a lowermost dome or polar part or portion 16. A plurality of circumferentially spaced hollow legs 18 are formed from the hemispherical bottom portion 14 with the legs 18 terminating at their lower ends in feet 20. The feet 20 are spaced downwardly below the polar part 16 by a distance d. This spacing of the feet 20 below the polar part 16 provides a gap that assures that when the container 10 is filled and internally pressurized as in the case of a carbonated beverage, the feet 20 will always be disposed lowermost and provide a stable base for the container 10.

In an effort to decrease the cycle time in the blow molding of containers, such as the container 10, in blow molds, attempts have been made to restrict the cooling time of the molded container 10 within an associated blow mold. It has been found that the bottom structure is not sufficiently set if the time within the blow mold is not at least a predetermined minimum, and when the bottom structure is not completely set there is an axial shrinkage of the feet 20 generally toward the hemispherical bottom portion with the result that the spacing or gap d is decreased to a distance which is not sufficient to prevent the polar part to remain above the feet 20 in the filled and pressurized condition of the container.

In accordance with this invention it is proposed to modify the container 10 in its as molded condition so as to permit the shortening of the time within the blow mold and at the same time to compensate for the shrinkage. Accordingly, a bottom mold segment 22 normally used to mold the bottom structure 12 of the container 10 is modified so as when the bottom structure 12 is initially blow molded within the bottom mold 22, the hemispherical bottom portion 14 is flattened at its polar part and thus is provided with a flat polar part 24, as is clearly shown in FIG. 2. The molded legs 18 and feet 20 remain substantially the same as that described and illustrated relative to the prior art container 10. Accordingly, no further description is required. However, the feet 20 are now axially spaced from the polar part of the hemispherical bottom portion by a distance d plus x.

The molded bottle of FIG. 2, which is identified by the numeral 26, when removed from the mold 22 without the usual cooling, is subject to a shrinkage and the completely blow molded and cooled bottle is best illustrated in FIG. 3. It will be noted that the legs 18 have shrunk toward the hemispherical bottom portion 14 with the feet 20 moving generally toward the plane of the flattened polar part 24 and with the original spacing d between the feet 20 and the polar part 24 being reduced to the prior dimension d.

While the molded container or bottle 26 does have a slightly distorted or flattened polar part, it is to be understood that the bottom structure is not unduly weakened in that in the natural formation of the bottom there is an undue thickening of the plastic material at the polar part and thus an undue thickening of the plastic material overstrengthens the polar part so that it no longer requires the hemispherical shape to resist distortion under undue pressure. Accordingly, the flattening of the polar part in no way reduces the rigidity or strength of the bottom portion of the container 26 as compared to the container 10.

It has been found that with the slight modification to the mold 22 specifically illustrated in FIG. 2 and the resultant change in the bottom structure configuration, the residence time in the blow mold 22 may be reduced on the order of 40 to 50%. Thus the total blow cycle for a two liter bottle formed of suitable plastic material may be reduced in a like manner, thereby providing for a production increase on the order of 15%. At the same time, no undue weakening of the bottom occurs.

Reference is now made to FIG. 4, wherein a further modified mold bottom element 28 is illustrated. The mold bottom element or segment 28 has been further modified so that a bottle 30 blow molded therein will have the polar part 32 of the hemispherical bottom portion 34 convexly upwardly offset. The bottom structure will otherwise be the same, including hollow legs 36 depending from the hemispherical bottom structure 34 terminating in feet 38. It will be seen that the bottom structure molded with the mold 28 increases the spacing between the feet 38 and the polar part 32 a dimension x so as to make the as molded spacing d+x. When the container 30 shrinks upon cooling, this distance or dimension will be reduced to the dimension d as is desired in accordance with the invention.

It is to be understood that the spacing between the polar part of the hemispherical bottom portion and the feet may be increased by other means including by increasing the depth of the legs 18. However, this requires a much greater modification of the mold than that provided for in accordance with this invention.

Although only a preferred embodiment of the invention has been spacifically illustrated and described herein, it is to be understood that minor variations may be made in the as molded bottom structure without departing from the spirit and scope of the invention as defined by the appended claims.

We claim:

1. A blow molded plastic material bottle bottom structure comprising a generally hemispherical outwardly convex bottom wall interrupted by a plurality of downwardly projecting wall portions defining hollow legs terminating in lower feet; said bottom wall having a lower polar portion of a smoothly continuous configuration and upwardly offset from and directly joined to said hemispherical configuration.

2. The bottom structure of claim 1 wherein said polar portion is flat.

3. The bottom structure of claim 1 wherein said polar portion is upwardly convex.

* * * * *